United States Patent
Xia et al.

(10) Patent No.: US 10,578,497 B2
(45) Date of Patent: Mar. 3, 2020

(54) DIODE-BASED TEMPERATURE SENSOR

(71) Applicant: QUALCOMM Incorporated, San Diego, CA (US)

(72) Inventors: William Xia, San Diego, CA (US); Yang Du, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 205 days.

(21) Appl. No.: 15/706,734

(22) Filed: Sep. 17, 2017

(65) Prior Publication Data

US 2019/0086272 A1 Mar. 21, 2019

(51) Int. Cl.
  *G01K 7/01* (2006.01)
  *G01K 7/02* (2006.01)
  *G01K 3/00* (2006.01)

(52) U.S. Cl.
  CPC .............. *G01K 7/01* (2013.01); *G01K 3/005* (2013.01); *G01K 7/02* (2013.01)

(58) Field of Classification Search
  CPC .................................. G01K 7/01; G01K 3/005
  See application file for complete search history.

(56) References Cited

U.S. PATENT DOCUMENTS

| | | | | |
|---|---|---|---|---|
| 5,546,041 A * | 8/1996 | Szajda | .............. | G01K 7/01 307/650 |
| 6,149,299 A * | 11/2000 | Aslan | .............. | G01K 7/01 374/178 |
| 6,157,244 A * | 12/2000 | Lee | .............. | G01K 7/01 323/313 |
| 7,108,420 B1 * | 9/2006 | Schnaitter | .............. | G01K 7/01 374/168 |
| 7,118,273 B1 * | 10/2006 | Schnaitter | .............. | G01K 7/01 374/168 |
| 8,350,552 B1 | 1/2013 | Marten | | |
| 8,695,433 B2 | 4/2014 | Shimazu et al. | | |
| 9,816,872 B2 * | 11/2017 | Zhang | .............. | G01K 13/00 |
| 9,970,826 B2 * | 5/2018 | Xia | .............. | G01K 7/015 |
| 10,132,696 B2 * | 11/2018 | Kiep | .............. | G01K 7/01 |
| 2004/0001527 A1 * | 1/2004 | Grannes | .............. | G01K 7/01 374/178 |
| 2010/0046580 A1 * | 2/2010 | Hasegawa | .............. | G01K 7/01 374/178 |
| 2011/0234300 A1 * | 9/2011 | Zhang | .............. | G01K 7/01 327/512 |
| 2011/0268151 A1 * | 11/2011 | Hadwen | .............. | B01L 3/502792 374/141 |
| 2014/0184311 A1 * | 7/2014 | Seshita | .............. | G01K 7/01 327/513 |
| 2014/0341257 A1 * | 11/2014 | Bernardinis | .............. | G01D 5/2454 374/178 |

(Continued)

*Primary Examiner* — Lisa M Caputo
*Assistant Examiner* — Philip L Cotey
(74) *Attorney, Agent, or Firm* — Holland & Hart LLP (57) ABSTRACT

Disclosed is a system for measuring temperature in an integrated circuit (IC) device. The system includes a diode-based temperature sensor comprising a first plurality of diodes coupled between a power supply pin of the IC device and a ground pin of the IC device and a second plurality of diodes coupled between the power supply pin and the ground pin, and a voltage sensing circuit configured to detect a voltage difference between the first plurality of diodes and the second plurality of diodes.

30 Claims, 4 Drawing Sheets

(56) References Cited

U.S. PATENT DOCUMENTS

| | | | |
|---|---|---|---|
| 2015/0346038 A1* | 12/2015 | Osanai | G01K 7/01 374/178 |
| 2016/0047696 A1* | 2/2016 | Ramaraju | G01K 7/01 374/170 |
| 2016/0123817 A1* | 5/2016 | Bennett | G01K 7/16 345/156 |
| 2016/0258819 A1 | 9/2016 | Xia et al. | |
| 2016/0290875 A1 | 10/2016 | Vaiana et al. | |
| 2016/0320247 A1* | 11/2016 | Schnaitter | G01K 7/01 |

* cited by examiner

DIODE-BASED TEMPERATURE SENSOR

BACKGROUND

1. Field of the Disclosure

Aspects relate to a diode-based temperature sensor.

2. Description of the Related Art

Integrated circuit devices, such as processors, microcontrollers, application specific integrated circuits (ASICs), field programmable gate arrays (FPGAs), and the like, include numerous types of discrete circuit components, such as transistors, resistors, capacitors, and the like. The designers of such devices regularly attempt to increase the speed and performance of integrated circuit devices while at the same time reducing their size and maintaining their reliability. However, the presence of hundreds of thousands or even millions of closely-spaced discrete circuit components exhibiting sub-micron dimensions and operating at high clock rates inevitably causes the integrated circuit device to exhibit high power dissipation and heating.

High temperatures can damage or destroy integrated circuit components. In addition, operating an integrated circuit device at a temperature above a certain threshold may indicate a design or manufacturing defect. As such, there are many techniques and devices to measure the temperature of an integrated circuit device.

For example, many conventional temperature sensors function based on the temperature dependence of the base-emitter voltage ($V_{BE}$) of bipolar junction transistors (BJTs) or the forward bias voltage of p/n junction diodes. However, in such sensors, device mismatch, voltage drop (e.g., IR drop), and temperature dependence of the parasitic resistance along the path from the power supply (and/or ground) to the temperature sensor terminals affects the temperature measurement results. These factors detrimentally reduce the signal to noise ratio, decrease measurement resolution, decrease measurement accuracy, and reduce measurement reliability. BJT-based temperature sensors also consume more silicon area.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a system for measuring temperature in an integrated circuit (IC) device includes a diode-based temperature sensor comprising: a first plurality of diodes coupled between a power supply pin of the IC device and a ground pin of the IC device and a second plurality of diodes coupled between the power supply pin and the ground pin, and a voltage sensing circuit configured to detect a voltage difference between the first plurality of diodes and the second plurality of diodes.

In an aspect, a diode-based temperature sensor for measuring temperature in an IC device includes a first plurality of diodes coupled between a power supply pin of the IC device and a ground pin of the IC device, and a second plurality of diodes coupled between the power supply pin and the ground pin, wherein the diode-based temperature sensor is coupled to a voltage sensing circuit configured to detect a voltage difference between the first plurality of diodes and the second plurality of diodes.

In an aspect, a system for measuring temperature in an IC device includes temperature sensing means comprising: a first plurality of diodes coupled between a power supply pin of the IC device and a ground pin of the IC device and a second plurality of diodes coupled between the power supply pin and the ground pin, and a voltage sensing means configured to detect a voltage difference between the first plurality of diodes and the second plurality of diodes.

In an aspect, an apparatus for measuring temperature in an IC device includes a first plurality of diode means coupled between a power supply pin of the IC device and a ground pin of the IC device, and a second plurality of diode means coupled between the power supply pin and the ground pin, wherein the apparatus is coupled to a voltage sensing means configured to detect a voltage difference between the first plurality of diode means and the second plurality of diode means.

Other objects and advantages associated with the aspects disclosed herein will be apparent to those skilled in the art based on the accompanying drawings and detailed description.

BRIEF DESCRIPTION OF THE DRAWINGS

A more complete appreciation of aspects of the disclosure will be readily obtained as the same becomes better understood by reference to the following detailed description when considered in connection with the accompanying drawings which are presented solely for illustration and not limitation of the disclosure, and in which.

DETAILED DESCRIPTION

Disclosed is a system for measuring temperature in an integrated circuit (IC) device. The system includes a diode-based temperature sensor comprising a first plurality of diodes coupled between a power supply pin of the IC device and a ground pin of the IC device and a second plurality of diodes coupled between the power supply pin and the ground pin, and a voltage sensing circuit configured to detect a voltage difference between the first plurality of diodes and the second plurality of diodes.

These and other aspects of the disclosure are disclosed in the following description and related drawings directed to specific aspects of the disclosure. Alternate aspects may be devised without departing from the scope of the disclosure. Additionally, well-known elements of the disclosure will not be described in detail or will be omitted so as not to obscure the relevant details of the disclosure.

Examples are disclosed in this application's text and drawings. Alternate examples can be devised without departing from the scope of the invention. Additionally, conventional elements of the current teachings may not be described in detail, or may be omitted, to avoid obscuring aspects of the current teachings. As used herein, the term "exemplary" means "serving as an example, instance, or illustration." Any example described as "exemplary" is not necessarily to be construed as preferred or advantageous over other examples. Likewise, the term "examples of the invention" does not require that all examples of the invention include the discussed feature, advantage, or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

It should be noted that the terms "connected," "coupled," and any variant thereof, mean any connection or coupling between elements, either direct or indirect, and can encompass a presence of an intermediate element between two elements that are "connected" or "coupled" together via the intermediate element. Coupling and connection between the elements can be physical, logical, or a combination thereof. Elements can be "connected" or "coupled" together, for example, by using one or more wires, cables, printed electrical connections, electromagnetic energy, and the like. The electromagnetic energy can have a wavelength at a radio frequency, a microwave frequency, a visible optical frequency, an invisible optical frequency, and the like. These are several non-limiting and non-exhaustive examples.

The term "signal" can include any signal such as a data signal, an audio signal, a video signal, a multimedia signal, an analog signal, a digital signal, and the like. Information can be represented using any of a variety of different technologies and techniques. For example, data, an instruction, a process step, a command, information, a signal, a bit, a symbol, and the like can be represented by a voltage, a current, an electromagnetic wave, a magnetic field, a magnetic particle, an optical field, and optical particle, and any combination thereof.

A reference using a designation such as "first," "second," and so forth does not limit either the quantity or the order of those elements. Rather, these designations are used as a convenient method of distinguishing between two or more elements. Thus, a reference to first and second elements does not mean that only two elements can be employed, or that the first element must necessarily precede the second element. Also, unless stated otherwise, a set of elements can comprise one or more elements. In addition, terminology of the form "at least one of: A, B, or C" used in the description or the claims can be interpreted as "A or B or C or any combination of these elements." For example, this terminology may include A, or B, or C, or A and B, or A and C, or A and B and C, or 2A, or 2B, or 2C, and so on.

The terminology used herein is for the purpose of describing particular examples only and is not intended to be limiting. As used herein, the singular forms "a," "an," and "the" include the plural forms as well, unless the context clearly indicates otherwise. Further, the terms "comprises," "comprising," "includes," and "including," specify a presence of a feature, an integer, a step, an operation, an element, a component, and the like, but do not necessarily preclude a presence or an addition of another feature, integer, step, operation, element, component, and the like.

The provided apparatuses can be a part of, and/or coupled to, an electronic device such as, but not limited to, at least one of a mobile device, a navigation device (e.g., a global positioning system receiver), a wireless device, a camera, an audio player, a camcorder, a game console, or the like.

The term "mobile device" can describe, and is not limited to, at least one of a mobile phone, a mobile communication device, a mobile hand-held computer, a portable computer, a tablet computer, a wireless device, a wireless modem, other types of portable electronic devices typically carried by a person and having electro-magnetic communication capabilities, a tablet computer, or any other electronic device that is person-portable. Further, the terms "user equipment" (UE), "mobile terminal," "user device," "mobile device," and "wireless device" can describe the same device.

Figure 1A:
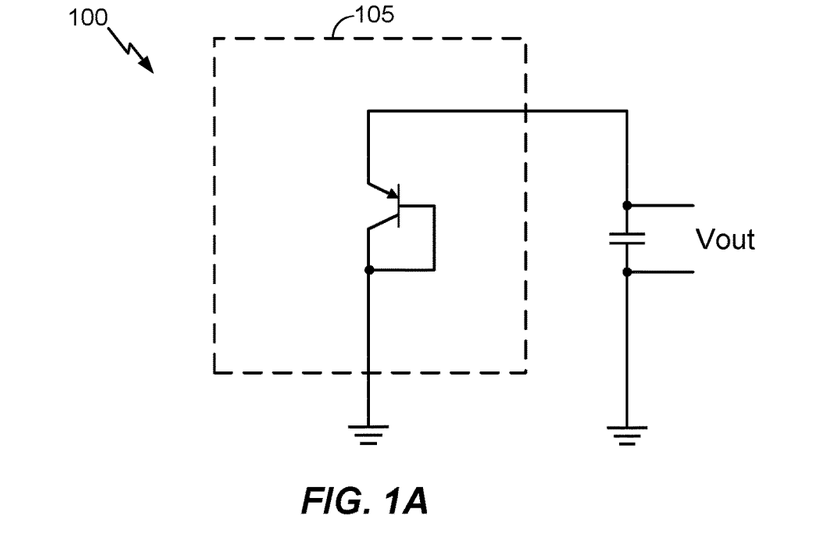
FIG. 1A depicts an exemplary Bipolar Junction Transistor (BJT) temperature sensor.

FIG. 1A depicts an exemplary Bipolar Junction Transistor (BJT) temperature sensor 100. The BJT temperature sensor 100 includes a BJT 105 that is diode-connected, that is, the base of BJT 105 is coupled to the collector of BJT 105. The diode-connection configures the BJT 105 into a temperature sensor by causing changes in voltage drops across the BJT 105 to depend upon temperature changes of the BJT 105. For example, base-emitter voltage ($V_{BE}$) of the BJT 105 can be determined as follows:

$$V_{BE} = V_{G0}\left(1 - \frac{T}{T_0}\right) + V_{BE0}\left(\frac{T}{T_0}\right) + \left(\frac{nKT}{q}\right)\ln\left(\frac{T_0}{T}\right) + \left(\frac{KT}{q}\right)\ln\left(\frac{I_c}{I_{C0}}\right)$$

Equation One

In Equation One, $V_{BE}$ is the base-emitter voltage, $V_{G0}$ is the extrapolated energy band gap voltage at absolute zero, T is the absolute temperature (in Kelvin), $T_0$ is the reference temperature (in Kelvin), $V_{BE0}$ is the base-emitter voltage at $T_0$ and $I_{C0}$, n is the slope factor, K is the Boltzmann's constant, q is the charge of an electron, $I_c$ is the collector current at temperature T, and $I_{C0}$ is the reverse saturation current at temperature $T_0$.

Thus, absolute temperature can be measured by measuring and comparing band gap voltages at two different currents ($I_{C1}$ and $I_{C2}$), after eliminating some variables in Equation One:

$$\Delta V_{BE} = \left(\frac{KT}{q}\right)\ln\left(\frac{I_{C1}}{I_{C2}}\right)$$

Equation Two

In Equation Two, $\Delta V_{BE}$ is $V_{BE1}$ minus $V_{BE2}$, i.e., the difference in base-emitter voltage, $V_{BE1}$ is the base-emitter voltage with collector current $I_{C1}$, $V_{BE2}$ is the base-emitter voltage with collector current $I_{C2}$, $I_{C1}$ is the first collector current, and $I_{C2}$ is the second collector current.

Therefore, temperature T can be obtained by measuring $\Delta V_{BE}$ according to Equation Three as follows:

$$T = \frac{q}{K}\Delta V_{BE} \Big/ \ln\left(\frac{I_{C1}}{I_{C2}}\right)$$

Equation Three

In general, as temperature of the BJT 105 increases, more electrons in the BJT 105 move to the conduction band and $V_{BE}$ increases. Note that although the BJT 105 is depicted in FIG. 1A as a PNP (positive-negative-positive) transistor, the BJT 105 can alternatively be an NPN (negative-positive-negative) transistor.

Figure 1B:
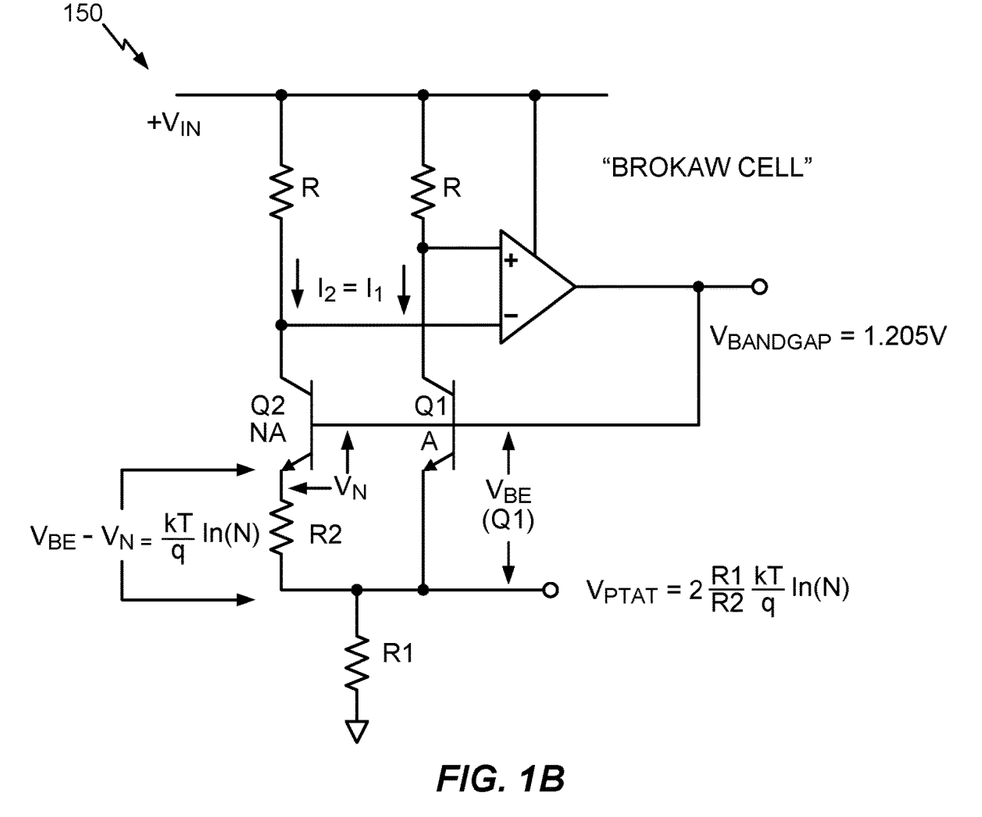
FIG. 1B depicts a Brokaw Cell.

FIG. 1B depicts a Brokaw Cell 150, which is a voltage reference circuit that can also be used as a temperature sensor. The Brokaw Cell 150 senses temperature with a pair of transistors (Q1, Q2) that have different emitter areas.

The Brokaw Cell 150 functions as follows. A single power supply provides two identical currents ($I_1$, $I_2$) through a pair of respective fixed resistors (R). A differential amplifier compares the voltages at the respective collectors of transistor Q1 and transistor Q2 and feeds back a voltage to the transistors bases that forces two identical currents ($I_1$, $I_2$) to flow respectively through the emitter of transistor Q1 and the emitter of transistor Q2. The respective base-emitter voltages (i.e., the voltage drop) across transistor Q1 and transistor Q2 are temperature dependent, as described in Equation One. The respective base-emitter voltages (i.e., the voltage drop) across transistor Q1 and transistor Q2 are also dissimilar, as the emitter areas of transistor Q1 and transistor Q2 are different. Transistor Q2's emitter current flows through fixed resistor R2, while transistor Q1's emitter current does not flow through fixed resistor R2. Transistor Q2's emitter current and transistor Q1's emitter current combine and flow through fixed resistor R1. The voltage across R1, $V_{PTAT}$, is proportional to absolute temperature (PTAT). The $V_{BE}$ of Q1 is complementary to absolute temperature (CTAT). The voltage at the base of Q1, $V_{BANDGAP}$, is the sum of $V_{PTAT}$ (PTAT) and $V_{BE}$ of Q1 (CTAT) and is constant over temperature.

The Brokaw Cell 150 outputs a proportional to absolute temperature (PTAT) measurement in the form of a voltage ($V_{PTAT}$) according to Equation Four:

$$V_{PTAT} = \frac{2R1(V_{BE} - V_N)}{R2} = 2\left(\frac{R1}{R2}\right)\left(\frac{kT}{q}\right)\ln(N) \quad \text{Equation Four}$$

In Equation Four, $V_{PTAT}$ is the voltage across R1 that is proportional to absolute temperature, R1 is the resistance of resistor R1 (See FIG. 1B), R2 is the resistance of resistor R2, $V_{BE}$ is the base-emitter voltage (in the case of FIG. 1B, the voltage across Q1's base-emitter), $V_n$ is the base-emitter voltage (in the case of FIG. 1B, the voltage across Q2's base-emitter), T is the absolute temperature (in Kelvin), k is the Boltzmann's constant, q is the charge of an electron, and N is the emitter-to-area ratio (i.e., N:1) of Q1 and Q2

The respective $V_{BE}$ for each of Q1 and Q1 has a negative temperature coefficient. However, due to the configuration of the Brokaw Cell 150, the $\Delta V_{BE}[=V_{BE}-V_n=V_{PTAT}*R2/(2*R1)]$ has a positive temperature coefficient.

As noted above, BJT-based temperature sensors suffer from device mismatch, voltage drop (e.g., IR drop), and temperature dependence of the parasitic resistance along the path from the power supply (and/or ground) to the temperature sensor terminals, which affects the temperature measurement results. These factors detrimentally reduce the signal to noise ratio, decrease measurement resolution, decrease measurement accuracy, and reduce measurement reliability. BJT-based temperature sensors also consume more silicon area.

It would be beneficial to improve the resolution and accuracy of temperature measurements and to reduce the area on the integrated circuit (IC) device taken by temperature sensors to monitor temperature distribution among the circuit components. Accordingly, the present disclosure provides a diode-based temperature sensor that reduces the footprint of the temperature sensor on the IC device compared to BJT-based temperature sensors. The bridge-type symmetric design of the disclosed diode-based temperature sensor may also improve the accuracy and resolution of temperature measurements, as the disclosed temperature sensor is independent of voltage drop and is also insensitive to the temperature dependence of the parasitic resistance along the path from the power supply (and/or ground) to the terminals of the temperature sensor.

The p/n junction possesses certain properties that have useful applications in modern electronics. Both p-doped and n-doped semiconductors are relatively conductive, but the junction between them can become depleted of charge carriers, and hence non-conductive, depending on the relative voltages of the two semiconductor regions. By manipulating this non-conductive layer, p/n junctions are commonly used as diodes, which are circuit elements that allow a flow of electricity in one direction but not in the other (opposite) direction. "Bias" is the application of a voltage across a p/n junction, "forward bias" is in the direction of easy current flow, and "reverse bias" is in the direction of little or no current flow. P/n junctions used as diodes are referred to as "p/n diodes" or "p/n junction diodes."

Figure 2:
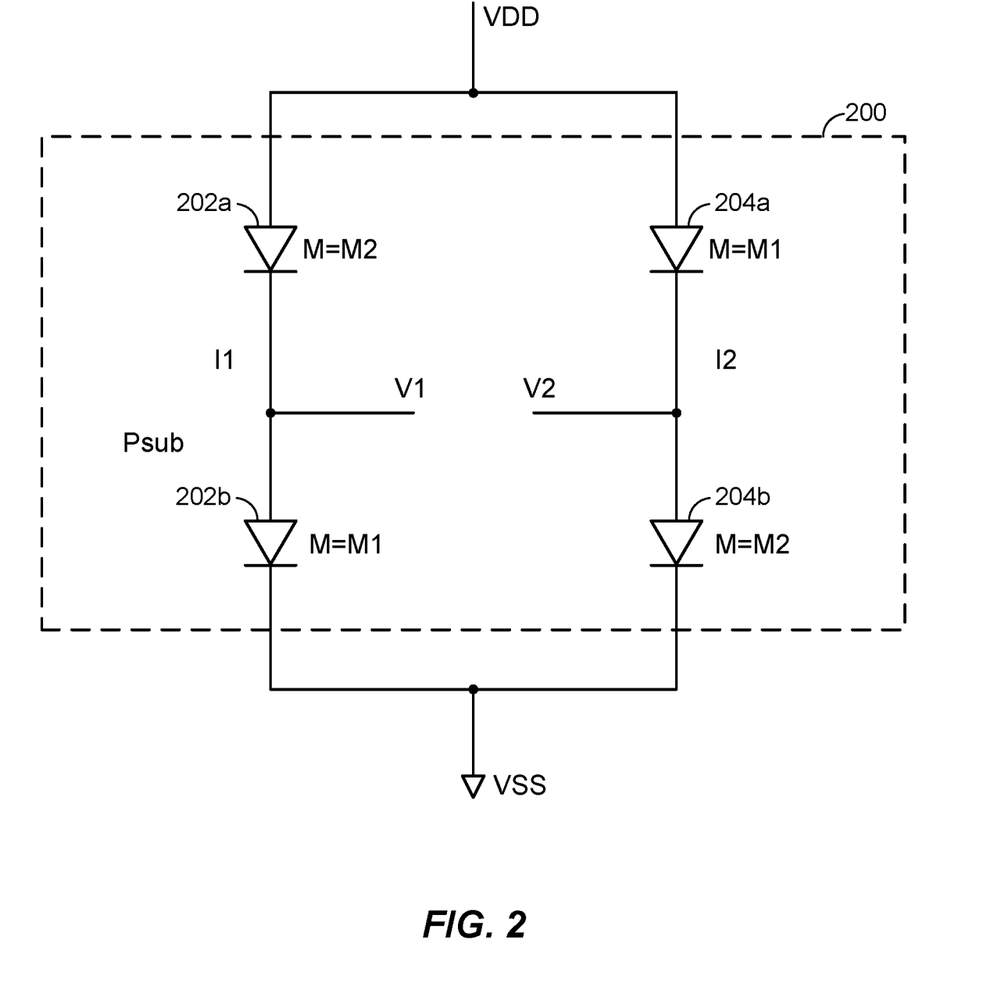
FIG. 2 illustrates an exemplary diode-based temperature sensor according to at least one aspect of the disclosure.

FIG. 2 illustrates an exemplary diode-based temperature sensor 200 according to at least one aspect of the disclosure. In FIG. 2, $V_{DD}$ represents an IC device power supply pin, and $V_{SS}$ represents a negative, or ground, IC device power supply pin. The diode-based temperature sensor 200 includes two pairs of diodes, diodes 202a-b and diodes 204a-b. In the example of FIG. 2, "M" represents the size of a diode, and "M1" and "M2" are different values of the size M. Thus, on the left side of the diode-based temperature sensor 200, the size of diode 202a is M2 and the size of diode 202b is M1. On the right side of the diode-based temperature sensor 200, the size of diode 204a is M1, and the size of diode 204b is M2. Note that M2 can be two to three times larger than M1. In addition, although M1 and M2 are not equal, M1 plus M2 is the same for both left and right sides.

In the diode-based temperature sensor 200 of FIG. 2, the current (I) can be represented as $qV/K_BT$, where q is the charge of electrons, $K_B$ is Boltzmann's constant, T is the temperature, and V is the voltage. The temperature (T) can be derived from this equation after eliminating various variables and measuring the voltage difference of V1 (of the current I1 between diodes 202a and 202b) minus V2 (of the current I2 between diodes 204a and 204b). Specifically, the temperature (T) may be calculated according to Equation Five:

$$T = \frac{q(V1 - V2)}{K_B \ln\left(\frac{M2}{M1}\right)} \quad \text{Equation Five}$$

In an aspect, the diodes of the diode-based temperature sensor 200 may be different types of p/n diodes, such as p (positive) and n (negative) junctions, n-plus, n-well, or deep n-well type semiconductor material, p-well or p-substrate type semiconductor material, or the like. Any of these different types of diodes may be referred to herein as a "diode" or a "diode means." Similarly, a diode-based temperature sensor 200 utilizing any of the above types of diodes may be referred to herein as a "temperature sensing means." In an aspect, the diodes 202a, 202b, 204a, and 204b are the same type of diode.

Figure 3A:
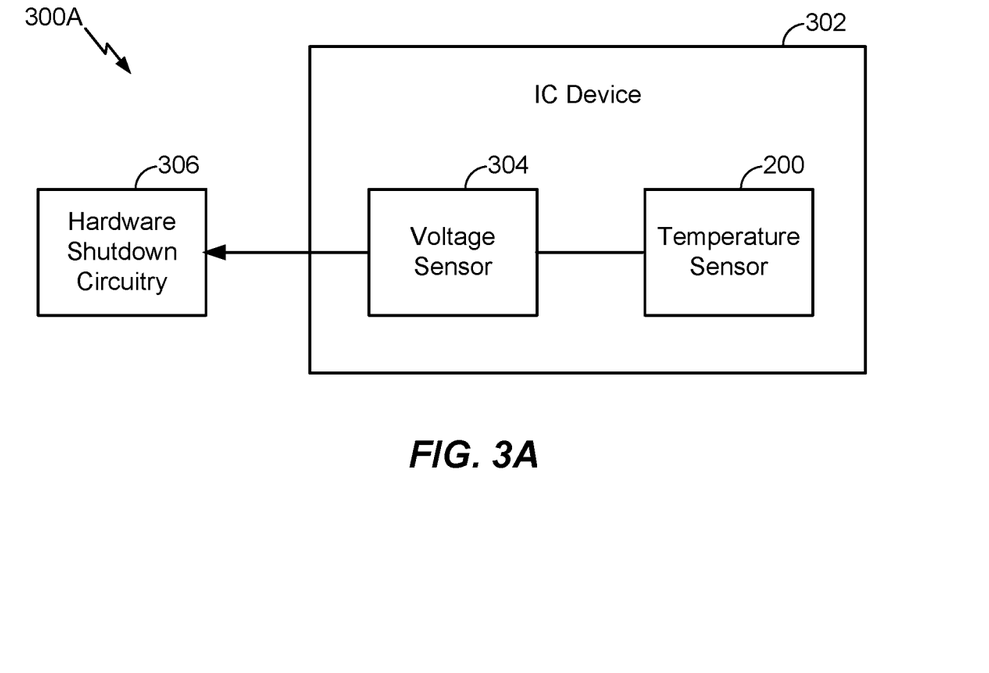
FIG. 3A illustrates an exemplary system in which a diode-based temperature sensor is coupled to an internal voltage sensing circuit according to an aspect of the disclosure.

The diode-based temperature sensor 200 may be coupled to, for example, an internal voltage sensing circuit or an external voltmeter in order to accurately measure the voltage difference V1 minus V2 and calculate the temperature (T) according to, for example, Equation Five. FIG. 3A illustrates an exemplary system 300A in which a diode-based temperature sensor 200 is coupled to an internal voltage sensing circuit according to an aspect of the disclosure. Specifically, in FIG. 3A, a diode-based temperature sensor 200 is coupled to an IC device 302 or, alternatively, some component of the IC device 302. An internal (to the IC device 302) voltage sensor 304 is coupled to the diode-based temperature sensor 200. With reference to FIG. 2, the voltage sensor 304 measures the voltages V1 and V2 of the currents I1 and I2 between the pairs of diodes 202a and 202b and 204a and 204b, respectively, of the diode-based temperature sensor 200.

The voltage sensor 304 may calculate the temperature (T) based on the difference between V1 minus V2 according to, for example, Equation Five. The voltage sensor 304 may send the calculated temperature (T) to hardware shutdown circuitry 306, which may be part of or separate from the IC device 302. Alternatively, the hardware shutdown circuitry 306 may calculate the temperature (T) based on the receiving voltages V1 and V2 from the voltage sensor 304. Either way, if the calculated temperature exceeds a certain threshold, indicating that the IC device 302 or, alternatively, the component of the IC device 302 to which the diode-based temperature sensor 200 may be coupled, is overheating, the hardware shutdown circuitry 306 can shut down the IC device 302 or, alternatively, the component of the IC device 302.

Figure 3B:
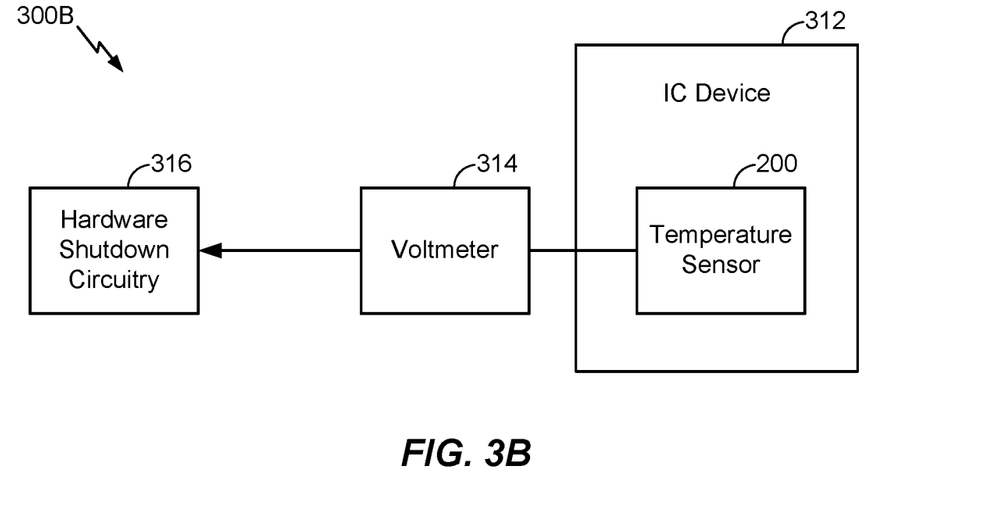
FIG. 3B illustrates an exemplary system in which a diode-based temperature sensor is coupled to an external voltmeter with high input impedance according to at least one aspect of the disclosure.

FIG. 3B illustrates an exemplary system 300B in which a diode-based temperature sensor 200 is coupled to an external voltmeter with high input impedance according to at least one aspect of the disclosure. Specifically, in FIG. 3B, a diode-based temperature sensor 200 is coupled to an IC device 312 or, alternatively, some component of the IC device 312. An external (to the IC device 312) voltmeter 314 is coupled to the diode-based temperature sensor 200. With reference to FIG. 2, the voltmeter 314 measures the voltages V1 and V2 of the currents I1 and I2 between the pairs of diodes 202a and 202b and 204a and 204b, respectively, of the diode-based temperature sensor 200. Note that as used herein, the voltage sensor 304 and the voltmeter 314 may be examples of a "voltage sensing means."

In the system 300B, the hardware shutdown circuitry 316 may calculate the temperature (T) based on the difference between V1 and V2 (i.e., V1−V2) according to, for example, Equation Five. If the calculated temperature exceeds a certain threshold, indicating that the IC device 302 or, alternatively, the component of the IC device 302 to which the diode-based temperature sensor 200 may be coupled, is overheating, the hardware shutdown circuitry 316 can shut down the IC device 312 or, alternatively, the component of the IC device 312.

Although not illustrated in FIGS. 2 to 3B, analog to digital converters may be added to the diode-based temperature sensor 200 to obtain digital output for the temperature reading.

The diode-based temperature sensor of the present disclosure consumes much less (e.g., several times smaller) area than BJT-based temperature sensors and may improve accuracy and resolution of temperature sensors. The signal-to-noise ratio of the disclosed diode-based temperature sensor may be improved over conventional temperature sensors by measuring the voltage difference (i.e., V1−V2) from the bridge-type design of the disclosed diode-based temperature sensor. In addition, the temperature reading will not be sensitive to voltage drop or temperature dependence of the voltage drop along the current paths.

Figure 4:
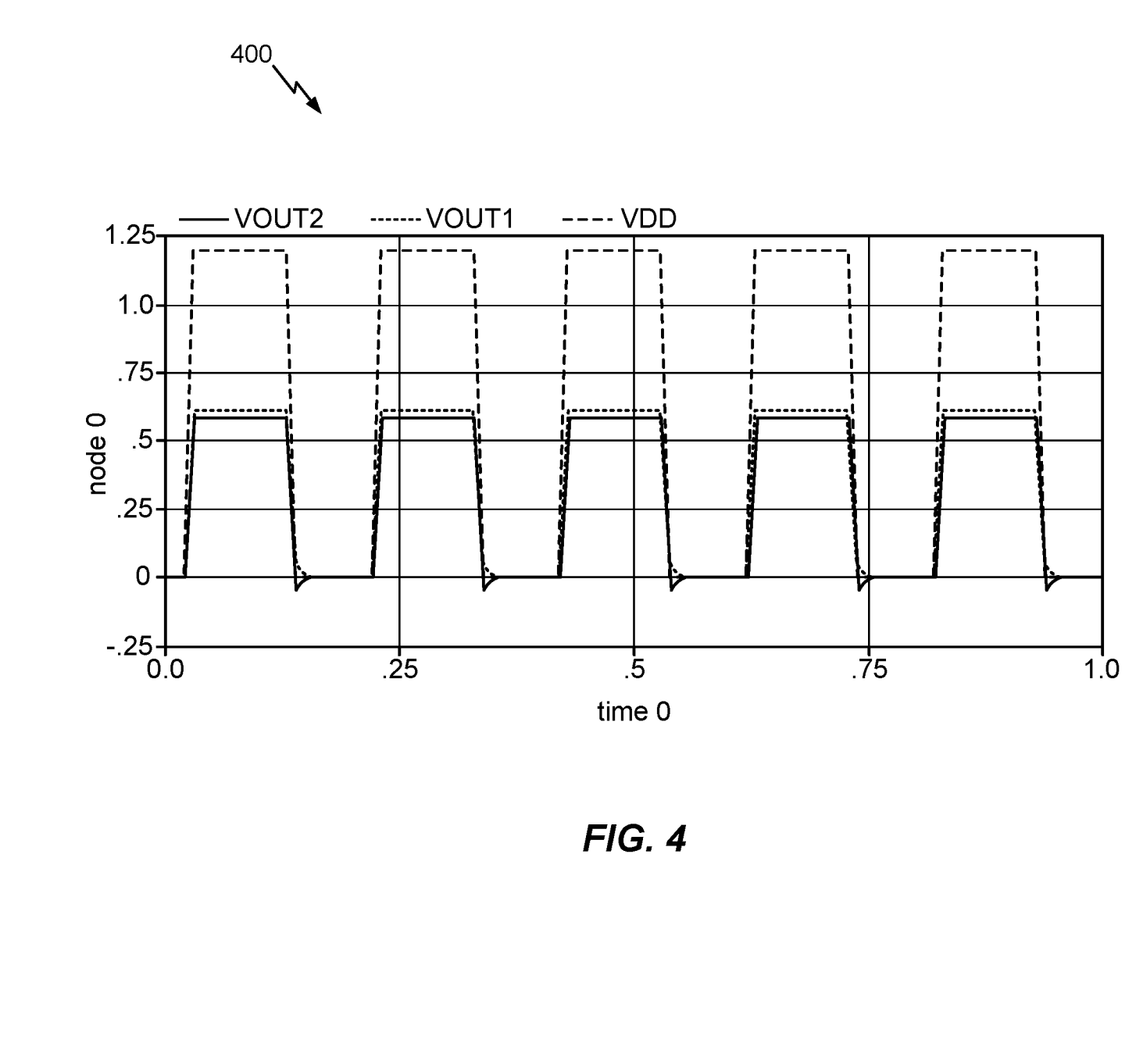
FIG. 4 illustrates a graph of an exemplary pulse wave simulation using a diode-based temperature sensor according to at least one aspect of the disclosure.

FIG. 4 illustrates a graph 400 of an exemplary pulse wave simulation using a diode-based temperature sensor, such as diode-based temperature sensor 200, according to at least one aspect of the disclosure. In the graph 400, the absolute temperature (T) is expected to be linear to $V_{OUT}1$ minus $V_{OUT}2$ and the inverse of ln(M2/M1) (i.e., 1/ln(M2/M1)), where M1 and M2 may be integers.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A system for measuring temperature in an integrated circuit (IC) device, the system comprising:
   a diode-based temperature sensor comprising:
      a first plurality of diodes connected in series and coupled between a power supply pin of the IC device and a ground pin of the IC device, wherein a first terminal of a diode of the first plurality of diodes is directly connected to the power supply pin, and wherein a second terminal of the diode of the first plurality of diodes is directly connected to a first terminal of another diode of the first plurality of diodes; and
      a second plurality of diodes connected in series and coupled between the power supply pin and the ground pin, wherein the first plurality of diodes is connected in parallel to the second plurality of diodes, and wherein one diode of the first plurality of diodes is multiple times larger than remaining diodes of the first plurality of diodes; and a voltage sensing circuit configured to detect a voltage difference between a first node located between two diodes of the first plurality of diodes and a second node located between two diodes of the second plurality of diodes.

2. The system of claim 1, wherein a number of the first plurality of diodes and a number of the second plurality of diodes are the same.

3. The system of claim 1, wherein the first plurality of diodes and the second plurality of diodes each comprise two diodes.

4. The system of claim 1, wherein:
one diode of the second plurality of diodes is multiple times larger than remaining diodes of the second plurality of diodes, and
a sum of sizes of the first plurality of diodes is equal to a sum of sizes of the second plurality of diodes.

5. The system of claim 1, wherein:
a first current flows between diodes of the first plurality of diodes,
a second current flows between diodes of the second plurality of diodes, and
to detect the voltage difference between the first node and the second node, the voltage sensing circuit is configured to detect a voltage difference between the first current and the second current.

6. The system of claim 5, wherein a total current through the first plurality of diodes is the same as a total current through the second plurality of diodes.

7. The system of claim 1, wherein the diode-based temperature sensor is coupled to and measures a temperature of the IC device or a component of the IC device.

8. The system of claim 7, wherein the voltage sensing circuit comprises a voltage sensor internal to the IC device or a voltmeter external to the IC device.

9. The system of claim 7, wherein the temperature of the IC device or the component of the IC device is calculated based on the voltage difference between the first node and the second node.

10. The system of claim 9, wherein the temperature of the IC device or the component of the IC device is calculated according to $T=[q(V1-V2)]/[K_B \ln (M2/M1)]$, where T represents the temperature of the IC device or the component of the IC device, q represents the charge of electrons, V1−V2 represents the voltage difference between the first node and the second node, $K_B$ represents Boltzmann's constant, M1 represents a size of a diode of the second plurality of diodes, and M2 represents a size of another diode of the second plurality of diodes.

11. The system of claim 1, wherein:
the first plurality of diodes comprise p/n diodes, and
the second plurality of diodes comprise p/n diodes.

12. The system of claim 11, wherein:
the p/n diodes of the first plurality of diodes comprise p (positive) and n (negative) junctions, n-plus, n-well, or deep n-well type semiconductor material, or p-well or p-substrate type semiconductor material, and
the p/n diodes of the second plurality of diodes comprise p and n junctions, n-plus, n-well, or deep n-well type semiconductor material, or p-well or p-substrate type semiconductor material.

13. The system of claim 12, wherein the second plurality of diodes are of the same type of diode as the first plurality of diodes.

14. The system of claim 1, wherein a first terminal of a diode of the second plurality of diodes is directly connected to the power supply pin, and wherein a second terminal of the diode of the second plurality of diodes is directly connected to a first terminal of another diode of the second plurality of diodes.

15. A diode-based temperature sensor for measuring temperature in an integrated circuit (IC) device, the diode-based temperature sensor comprising:
a first plurality of diodes connected in series and coupled between a power supply pin of the IC device and a ground pin of the IC device, wherein a first terminal of a diode of the first plurality of diodes is directly connected to the power supply pin, and wherein a second terminal of the diode of the first plurality of diodes is directly connected to a first terminal of another diode of the first plurality of diodes; and
a second plurality of diodes connected in series and coupled between the power supply pin and the ground pin,
wherein the first plurality of diodes is connected in parallel to the second plurality of diodes,
wherein one diode of the first plurality of diodes is multiple times larger than remaining diodes of the first plurality of diodes, and
wherein the diode-based temperature sensor is coupled to a voltage sensing circuit configured to detect a voltage difference between a first node located between two diodes of the first plurality of diodes and a second node located between two diodes of the second plurality of diodes.

16. The diode-based temperature sensor of claim 15, wherein a number of the first plurality of diodes and a number of the second plurality of diodes are the same.

17. The diode-based temperature sensor of claim 15, wherein the first plurality of diodes and the second plurality of diodes each comprise two diodes.

18. The diode-based temperature sensor of claim 15, wherein:
one diode of the second plurality of diodes is multiple times larger than remaining diodes of the second plurality of diodes, and
a sum of sizes of the first plurality of diodes is equal to a sum of sizes of the second plurality of diodes.

19. The diode-based temperature sensor of claim 15, wherein:
a first current flows between diodes of the first plurality of diodes,
a second current flows between diodes of the second plurality of diodes, and
to detect the voltage difference between the first node and the second node, the voltage sensing circuit is configured to detect a voltage difference between the first current and the second current.

20. The diode-based temperature sensor of claim 19, wherein a total current through the first plurality of diodes is the same as a total current through the second plurality of diodes.

21. The diode-based temperature sensor of claim 15, wherein the diode-based temperature sensor is coupled to and measures a temperature of the IC device or a component of the IC device.

22. The diode-based temperature sensor of claim 21, wherein the temperature of the IC device or the component of the IC device is calculated based on the voltage difference between the first node and the second node.

23. The diode-based temperature sensor of claim 22, wherein the temperature of the IC device or the component of the IC device is calculated according to $T=[q(V1-V2)]/[K_B \ln(M2/M1)]$, where T represents the temperature of the IC device or the component of the IC device, q represents the charge of electrons, V1−V2 represents the voltage difference between the first node and the second node, $K_B$ represents Boltzmann's constant, M1 represents a size of a diode of the second plurality of diodes, and M2 represents a size of another diode of the second plurality of diodes.

24. The diode-based temperature sensor of claim 15, wherein:
the first plurality of diodes comprise p/n diodes, and
the second plurality of diodes comprise p/n diodes.

25. The diode-based temperature sensor of claim 24, wherein:
the p/n diodes of the first plurality of diodes comprise p (positive) and n (negative) junctions, n-plus, n-well, or deep n-well type semiconductor material, or p-well or p-substrate type semiconductor material, and
the p/n diodes of the second plurality of diodes comprise p and n junctions, n-plus, n-well, or deep n-well type semiconductor material, or p-well or p-substrate type semiconductor material.

26. The diode-based temperature sensor of claim 25, wherein the second plurality of diodes are of the same type of diode as the first plurality of diodes.

27. The diode-based temperature sensor of claim 15, wherein the diode-based temperature sensor is coupled to the power supply pin coupled to the IC device and the ground pin coupled to the IC device.

28. A system for measuring temperature in an integrated circuit (IC) device, the system comprising:
temperature sensing means comprising:
a first plurality of diodes connected in series and coupled between a power supply pin of the IC device and a ground pin of the IC device, wherein a first terminal of a diode of the first plurality of diodes is directly connected to the power supply pin, and wherein a second terminal of the diode of the first plurality of diodes is directly connected to a first terminal of another diode of the first plurality of diodes; and
a second plurality of diodes connected in series and coupled between the power supply pin and the ground pin, wherein the first plurality of diodes is connected in parallel to the second plurality of diodes, and wherein one diode of the first plurality of diodes is multiple times larger than remaining diodes of the first plurality of diodes; and
a voltage sensing means configured to detect a voltage difference between a first node located between two diodes of the first plurality of diodes and a second node located between two diodes of the second plurality of diodes.

29. The system of claim 28, wherein the voltage sensing means comprises a voltage sensor internal to the IC device or a voltmeter external to the IC device.

30. An apparatus for measuring temperature in an integrated circuit (IC) device, the apparatus comprising:
a first plurality of diode means connected in series and coupled between a power supply pin of the IC device and a ground pin of the IC device, wherein a first terminal of a diode of the first plurality of diodes is directly connected to the power supply pin, and wherein a second terminal of the diode of the first plurality of diodes is directly connected to a first terminal of another diode of the first plurality of diodes; and
a second plurality of diode means connected in series and coupled between the power supply pin and the ground pin,
wherein the first plurality of diode means is connected in parallel to the second plurality of diode means,
wherein one diode of the first plurality of diode means is multiple times larger than remaining diodes of the first plurality of diode means, and
wherein the apparatus is coupled to a voltage sensing means configured to detect a voltage difference between a first node located between two diodes of the first plurality of diode means and a second node located between two diodes of the second plurality of diode means.

* * * * *